United States Patent Office 2,769,809
Patented Nov. 6, 1956

2,769,809
TRIAZINE COMPOUNDS AND METHOD

George H. Hitchings, Tuckahoe, and Peter Byrom Russell, Crestwood, N. Y., assignors to Burroughs Wellcome Co. (U. S. A.) Inc., Tuckahoe, N. Y., a corporation of New York No Drawing. Application November 6, 1951,
Serial No. 255,136

Claims priority, application Great Britain November 10, 1950

4 Claims. (Cl. 260—249.5)

The present invention relates to new and improved derivatives of triazine, and of processes for the manufacture thereof.

We have found that certain derivatives of 1,3,5-triazine have valuable therapeutic properties and this action is particularly exemplified by amoebicidal activity. Compounds of the type having this remarkable effect are of the formula:

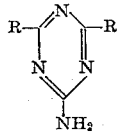

wherein R is a monocyclic aryl radical selected from the class consisting of the nitrogen heterocyclic radicals and the ortho unsubstituted phenyl radicals which are more positive than the p-tolyl group. As examples of groups represented by R and falling within the scope of the invention there may be mentioned phenyl, p-chlorphenyl, p-nitrophenyl, 3'-pyridyl, and 2'-methyl-4'-aminopyrimidyl. The amino-triazine system is itself only feebly basic and stable salts are formed only when basic groups are attached to R. In these cases, salts of non-toxic acids may be preferred to the bases for therapeutic purposes and are considered to be equivalents of the bases themselves.

The compounds of the general formula I may be conveniently synthesized by a reaction between a nitrile R–CN and guanidine which has now been found to take place and to lead directly to the formation of the desired triazine derivative.

The nitriles giving rise to 1,3,5-triazines in this manner are benzonitriles, benzonitriles substituted with electron attracting groups or heterocyclic nitriles of like electronic structure. The influence of substitution is believed to be manifested in two ways. The initial step of the reaction is believed to be an addition of the base, guanidine, to the positive carbon atom of the nitrile. This step is dependent primarily on the positive character of the nitrile carbon atom and when this is too much diminished by substitution as in 3,4-methylenedioxybenzonitrile Step 1 fails.

Step 1
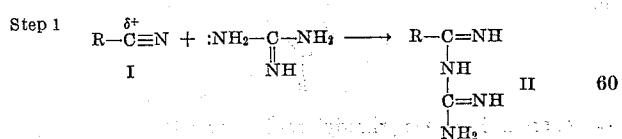

Step 2
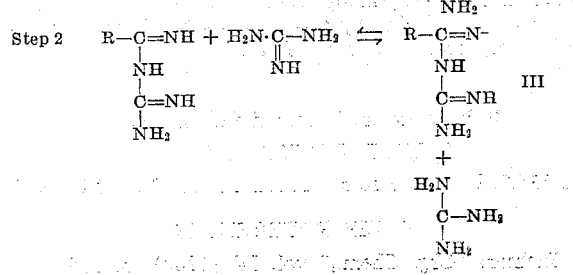

Step 2 may be considered reversible and reaction may be imagined as proceeding from the components of either side. For the formation of a diaryl triazine, however, reaction must take place with another molecule of nitrile and this is affected not only by electronic but by steric factors. Thus p-tolunitrile, in which the nitrile carbon should be more positive than that in 3,4-methylenedioxybenzonitrile but less so than in benzonitrile itself, reacts according to Step 1 but not according to Step 3. Consequently p-tolunitrile Step 3
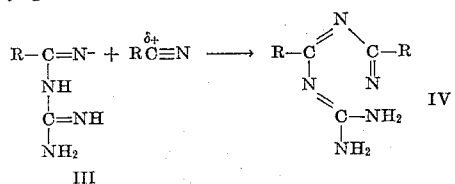

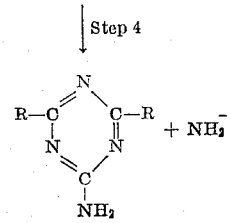

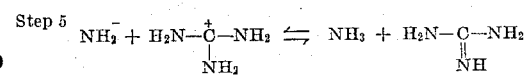

Step 5
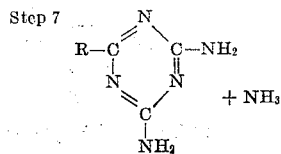

affords p-toluimido guanidine (Step 1) but no triazine whereas 3,4-methylenedioxybenzonitrile is recovered unchanged. Heterocyclic aryl nitriles such as pyridyl and pyrimidyl nitriles have electron attracting atoms within their rings, are more positive than benzonitrile and hence, like a benzonitrile bearing electron attracting substituents, react readily to yield diaryl triazines.

However, in Step 3, the positive character of the nitrile carbon is not the only factor involved. This reaction appears to be subject to hindrance and 4-cyanoquinoline, wherein the nitrile carbon is undoubtedly quite positive affords no diaryl triazine. It would appear that when Step 3 is impossible or is markedly hindered, competitive Step 6, also requiring positive character in the carbon originally of the nitrile, may occur:

Step 6
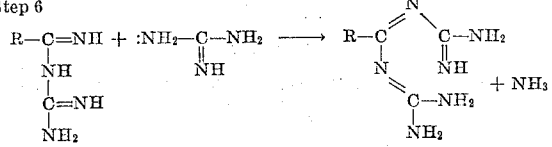

and as a result of Step 6 and the consecutive cyclization Step 7, a mono-aryl diamino triazine is formed. Similarly α-naphthonitrile and 2-methoxy-6-nitrobenzonitrile do not yield diaryl triazines. Hence the success of our invention requires not only a sufficiently positive nitrile carbon atom but also a freedom from bulky ortho substitution which is known to hinder reactions of addition. In certain cases, as with 2-methyl-4-amino-5-cyanopyrimidine a smaller group (amino) in the ortho position is not capable of blocking the addition.

Nitriles corresponding to these requirements and falling within the scope of the invention are non-ortho substituted halogeno and nitrobenzonitriles, heterocyclic aryl nitriles derived from nitrogen-containing rings such as pyridine and pyrimidine as well as benzonitrile itself.

The invention will now be illustrated by the following examples, in which all temperatures are given in degrees centigrade:

Example 1

2-AMINO-4,6-DI-(3'-PYRIDYL)-1,3,5-TRIAZINE

A solution of 20.8 g. (0.2 mole) of 3-cyanopyridine and guanidine (from 19.1 g. (0.2 mole) of the hydrochloride) were refluxed for sixteen hours; crystals began to separate soon after the heating was commenced. After cooling and filtration the precipitate of 2-amino-4,6-di-(3'-pyridyl)-1,3,5-triazine (15.0 g.) was recrystallized in colorless prisms from a large volume of boiling alcohol, melting point 320°–323°. (Found: C, 62.1; H, 4.0; N, 33.1; $C_{13}H_{10}N_6$ requires C, 62.4; H, 4.0; N, 33.6%.)

Four grams of the triazine were dissolved in 30 ml. of concentrated aqueous hydrochloric acid with gentle warming. On cooling, the hydrochloride (4.1 g.) crystallized as white needles which were very soluble in water, melting point 322°–323°.

In order to prepare the dimethiodide of 2-amino-4,6-di-(3'-pyridyl)-1,3,5-triazine four grams of the base were refluxed with 10 g. of methyl iodide in 100 ml. of acetone for five hours. The yellow solid which formed was filtered off and extracted with cold 90% ethanol. The methiodide was precipitated from the extract with ether-acetone (7:3 by volume). It was a canary-yellow powder which was not molten below 300°. (Found: C, 34.4; H, 2.9; $C_{15}H_{16}N_6I_2$ requires C, 33.9; H, 3.0%.)

The base (1 g.) was dissolved in a mixture of 5 ml. of concentrated hydrochloric acid and 5 ml. of ethanol with warming. On cooling the pentahydrochloride separates as small prisms, melting point above 350°.

Example 2

2-AMINO-4,6-DIPHENYL-1,3,5-TRIAZINE

Benzonitrile (18.2 g.) was refluxed with guanidine (from 19.1 g. of the hydrochloride and 4.6 g. sodium) for six hours in alcohol, 200 ml. The solution was evaporated to about 50 ml. and allowed to stand. Colorless needles separated which after recrystallization from alcohol melted at 168°–170°. (Found: C, 72.6; H, 4.8; N, 22.8; $C_{15}H_{12}N_4$ requires C, 72.6; H, 4.8; N, 22.6%.)

Example 3

2-AMINO-4,6-DI-(4'-AMINO-2'-METHYLPYRIMIDYL-5')-1,3,5-TRIAZINE

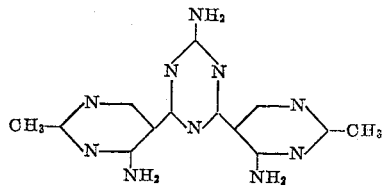

4-amino-2-methyl-5-cyanopyrimidine (5 g.) was refluxed with guanidine (from 3.62 g. of the hydrochloride and 0.85 g. sodium) in alcohol (100 ml.). The product commenced to separate after ½ hour. After one hour the white crystalline solid was filtered off and washed well with boiling alcohol. It weighed 4 g. The material darkened when heated above 300°, but failed to melt at 350°. (Found: C, 49.8; H, 4.3; N, 45.6; $C_{13}H_{14}N_{10}$ requires C, 50.3; H, 4.5; N, 45.2%.)

A pentahydrochloride of the above, prepared as described in Example 1, had an indeterminate melting point about 350° and crystallized as pale-yellow prisms from concentrated hydrochloric acid.

Example 4

By the reaction of p-chlorobenzonitrile in the manner already described there was produced 2-amino-4,6-di-p-chlorophenyl-1,3,5-triazine, melting point 254°, crystallizing from alcohol in colorless silky needles. (Found: C, 57.1; H, 3.1; N, 18.0; $C_{14}H_{10}N_4Cl_2$ requires C, 56.9; H, 3.2; N, 17.7%.)

Example 5

By the reaction of p-nitrobenzonitrile in the manner already described there was produced 2-amino-4,6-di-p-nitrophenyl-1,3,5-triazine, as an insoluble light-brown powder which was not molten at 320°. (Found: C, 52.9; H, 2.6; N, 25.4; $C_{16}H_{10}N_6O_4$ requires C, 53.2; H, 3.0; N, 24.9%.)

We claim:

1. A method of preparing 2-amino-4,6-diaryl-1,3,5-triazines of the formula

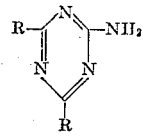

wherein R is selected from the class consisting of the phenyl, pyridyl and pyrimidyl radicals attached to a carbon atom of the triazine by a —C—C— bond, which comprises reacting a nitrile of the formula RCN with guanidine.

2. A method of preparing 2-amino-4,6-diaryl-1,3,5-triazines of the formula

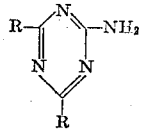

wherein R is a phenyl radical attached to a carbon atom of the triazine by a —C—C— bond, which comprises reacting a nitrile of the formula RCN with guanidine.

3. A method of preparing 2-amino-4,6-diaryl-1,3,5-triazines of the formula

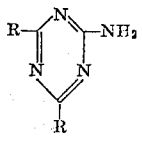

wherein R is a pyridyl radical attached to a carbon atom of the triazine by a —C—C— bond, which comprises reacting a nitrile of the formula RCN with guanidine.

4. A method of preparing 2-amino-4,6-diaryl-1,3,5-triazines of the formula

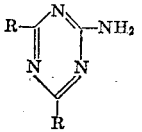

wherein R is a pyrimidyl radical attached to a carbon atom of the triazine by a —C—C— bond, which comprises reacting a nitrile of the formula RCN with guanidine.

References Cited in the file of this patent

UNITED STATES PATENTS 2,535,968   Thurston _____ Dec. 26, 1950

OTHER REFERENCES

Richter: "Org. Chem.," vol. IV (1947), p. 318.